(12) United States Patent
VanOrt et al.

(10) Patent No.: US 11,485,183 B2
(45) Date of Patent: Nov. 1, 2022

(54) BOLT ASSEMBLY FOR SPRING HANGER SYSTEM

(71) Applicant: Lippert Components, Inc., Elkhart, IN (US)

(72) Inventors: Kaleb VanOrt, Granger, IN (US); Andrew Hughes, Goshen, IN (US); Jonathan Frick, Elkhart, IN (US); Mohammed Taqiuddin, South Bend, IN (US); Bruce Bailey, Bristol, IN (US); Phillip Heiner, Middlebury, IN (US)

(73) Assignee: LIPPERT COMPONENTS, INC., Elkhart, IN (US)

( * ) Notice: Subject to any disclaimer, the term of this patent is extended or adjusted under 35 U.S.C. 154(b) by 0 days.

(21) Appl. No.: 17/336,503

(22) Filed: Jun. 2, 2021

(65) Prior Publication Data
US 2021/0283964 A1   Sep. 16, 2021

Related U.S. Application Data

(63) Continuation of application No. 16/444,114, filed on Jun. 18, 2019, now Pat. No. 11,034,203.

(60) Provisional application No. 62/686,345, filed on Jun. 18, 2018.

(51) Int. Cl.
*B60G 5/047*   (2006.01)

(52) U.S. Cl.
CPC .......... *B60G 5/047* (2013.01); *B60G 2204/44* (2013.01)

(58) Field of Classification Search
CPC ............................ B60G 5/047; B60G 2204/44
See application file for complete search history.

(56) References Cited

U.S. PATENT DOCUMENTS

| | | | | |
|---|---|---|---|---|
| 1,784,268 | A * | 12/1930 | Buckendale | B60G 5/02 180/24.11 |
| 3,482,854 | A * | 12/1969 | Masser | B60G 7/02 280/86.75 |
| 5,224,728 | A | 7/1993 | Ball | |
| 5,335,934 | A | 8/1994 | Hiller | |
| 5,647,603 | A | 7/1997 | Kass et al. | |
| 5,797,480 | A | 8/1998 | Gaddis et al. | |
| 5,799,965 | A | 9/1998 | Kass et al. | |
| 7,073,857 | B1 | 7/2006 | Bailey | |
| 7,144,041 | B2 | 12/2006 | Adams | |
| 7,210,692 | B2 * | 5/2007 | Galazin | B60G 7/006 280/124.1 |
| 7,461,865 | B2 | 12/2008 | Adams | |
| 7,802,709 | B1 | 9/2010 | Lewis et al. | |
| 8,006,990 | B1 * | 8/2011 | Davis | B60G 11/10 267/260 |
| 8,888,135 | B1 | 11/2014 | Reitnouer | |

(Continued)

*Primary Examiner* — Faye M Fleming
(74) *Attorney, Agent, or Firm* — Nixon & Vanderhye P.C.

(57) ABSTRACT

An axle hanger includes a web, a first flange extending in a first direction perpendicular to the web, and a second flange extending in the first direction perpendicular to the web, spaced from and parallel to the first flange. A first return extends from the first flange toward the second flange parallel to the web, and a second return extends from the second flange toward the first flange parallel to the web. The axle hanger is easier to install and access in the event a hanger spring needs replacement, and the hanger can be more stably secured to the axle.

18 Claims, 11 Drawing Sheets

(56) References Cited

U.S. PATENT DOCUMENTS 11,117,433 B2 * 9/2021 Johnson .................. B60G 7/02
2003/0205870 A1 * 11/2003 Dunlap .................. B60G 11/10
280/6.157

* cited by examiner

BOLT ASSEMBLY FOR SPRING HANGER SYSTEM

CROSS-REFERENCES TO RELATED APPLICATIONS

This application is a continuation of U.S. patent application Ser. No. 16/444,114 filed Jun. 18, 2019, pending, which claims the benefit of U.S. Provisional Patent Application No. 62/686,345, filed Jun. 18, 2018, the entire content of each of which is herein incorporated by reference.

STATEMENT REGARDING FEDERALLY SPONSORED RESEARCH OR DEVELOPMENT (Not Applicable)

BACKGROUND AND SUMMARY

Figure 1:
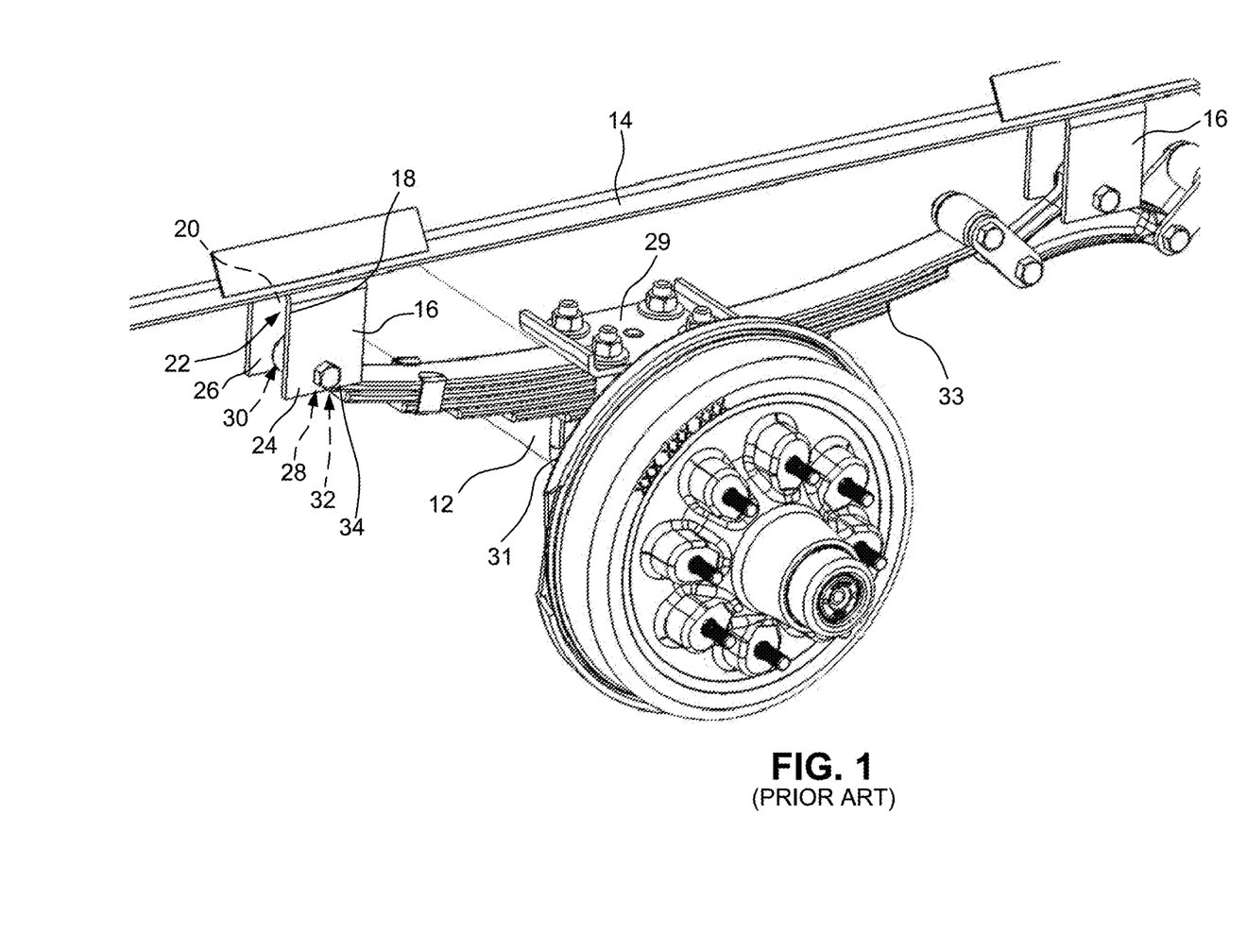
FIG. 1 is a perspective view of a trailer axle connected to a trailer in a conventional manner.

FIG. 1 shows a trailer axle 12 connected to a trailer frame 14 in a conventional manner. More specifically, FIG. 1 shows the trailer frame 14 bearing first and second spring hanger brackets 16. The brackets 16 may be made by bending a piece of steel sheet or plate into a U-shape along first and second bend lines 18, 20 to define a web 22 and first and second spaced apart and parallel flanges 24, 26. Each bracket 16 may be attached to the frame 14 by butting the web 22 against a portion of the frame and welding the bracket to the frame along the first and second bend lines 18, 20 and along the opposed edges of the web 22 extending between the first and second bend lines. The first flange 24 defines a first flange aperture 28 proximate the free end thereof, opposite the web 22. Similarly, the second flange 26 defines a second flange aperture 30 proximate the free end thereof, opposite the web 22. The first and second flange apertures 28, 30 are coaxially aligned along an axis perpendicular to the first and second flanges 24, 26.

FIG. 1 also shows a U-bolt 31 and bracket 29 connecting the axle 12 to the midpoint of a leaf spring 33. The ends of the leaf spring 33 define apertures 32. Each aperture 32 is coaxially aligned with the first and second flange apertures 28, 30 of a corresponding bracket 16. A hanger bolt 34 extends through each of the first and second flange apertures 28, 30 and the corresponding leaf spring aperture 32. The shank of the hanger bolt 34 typically includes a knurled portion near the head. The knurled portion is configured to engage with a corresponding one of the first and second flanges 24, 26 to preclude rotation of the hanger bolt with respect to the corresponding one of the flanges 24, 26. In an embodiment, as shown in FIG. 1, one or more intervening components, for example, equalizers, spring shackles, and the like, may be disposed between an end of the spring 33 and the corresponding bracket 16, and one of such intervening components may be connected to the spring 33 and the corresponding hanger 16 in a similar manner.

The foregoing manner of connecting a trailer axle to a trailer frame has numerous drawbacks. For example, the brackets 16 have high residual stresses along the first and second bend lines 18, 20. Welding the brackets 16 to the frame 14 along the bend lines 18, 20 can further increase the stresses along the bend lines, ultimately leading to fractures of the brackets along the weld lines. Also, conventional techniques for installing the hanger bolts 34 involve pounding the bolts into the brackets 16 with a sledge hammer to seat the knurled portion of the bolt's shank with the corresponding flange adjacent the corresponding aperture. This technique can be dangerous and tiring, and it has the potential for damaging the bolts 34, the frame 14, the springs 33, and the brackets 16. Further, once the hanger bolts 34 have been installed, they are difficult to remove, as might be necessary to replace a broken spring 33.

BRIEF DESCRIPTION OF THE DRAWINGS

These and other aspects and advantages will be described in detail with reference to the accompanying drawings, in which.

DETAILED DESCRIPTION

Figure 2:
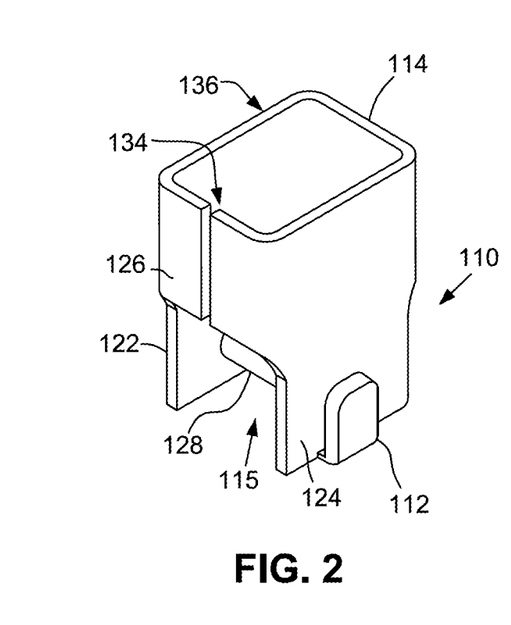
FIG. 2 is a perspective view of an illustrative spring hanger system according to the present disclosure.
Figure 3:
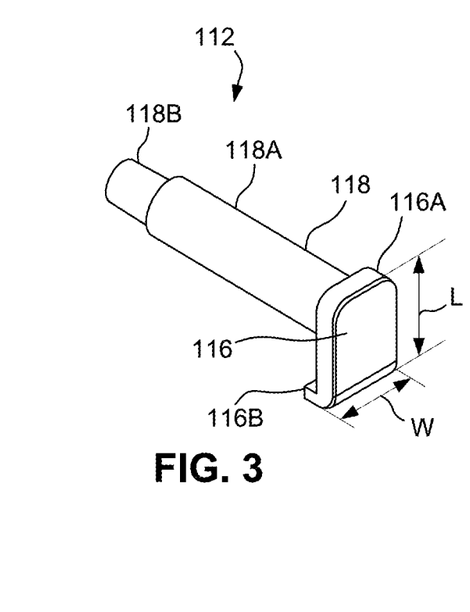
FIG. 3 is a perspective view of an illustrative spring hanger bolt according to the present disclosure.
Figure 4:
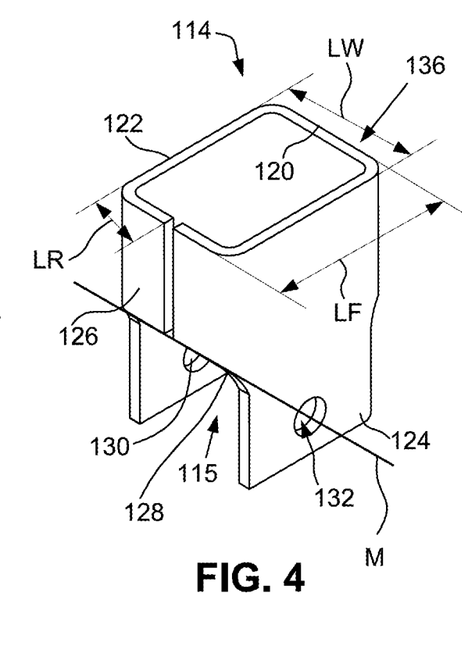
FIG. 4 is a perspective view of an illustrative spring hanger according to the present disclosure.

FIGS. 2-4 show an illustrative axle bolt and hanger system 110 according to the present disclosure. The system 110 includes a hanger bolt 112 (best shown in FIG. 3) and an axle hanger 114 (best shown in FIG. 4). The axle hanger 114 is configured to receive the axle bolt 112 and for connection to a vehicle chassis frame, as will be discussed further below.

As shown, the bolt 112 includes a head 116, a locking tab 116B and a shank 118. The head 116 is generally planar, having a first surface and an opposed second surface. Also, the head 116 is generally rectangular, having a first dimension (or length) L and a second dimension (or width) W. In some embodiments, the length L is greater than the width W. As such, the head 116 defines two spaced apart and parallel relatively long edges and two spaced apart and parallel relatively short edges, at least one side having a curved transition 116A. The locking tab 116B extends generally perpendicularly from one of the relatively short edges of the head 116.

The shank 118 includes a first generally cylindrical portion 118A having a first diameter and a second generally cylindrical portion 118B having a second diameter lesser than the first diameter. The first cylindrical portion 118A extends perpendicularly from the first surface of the head 116, in the same direction as the locking tab 116B. The second generally cylindrical portion 118B extends coaxially from the first cylindrical portion 118A. The second cylindrical portion 118B may define an external thread configured to receive a nut in threaded engagement, as will be discussed further below.

The hanger 114 includes a discontinuous annular wall having a generally rectangular cross section defining an interior region 115. More specifically, the hanger 114 includes a web 120, a first flange 122 extending in a first direction perpendicular to the web, a second flange 124 extending in the first direction perpendicular to the web, spaced from and parallel to the first flange, a first return 126 extending from the first flange toward the second flange parallel to the web, and a second return 128 extending from the second flange toward the first flange parallel to the web. Each of the first flange 122 and the second flange 124 defines a corresponding aperture 130, 132 extending through a lower portion thereof. The first aperture 130 and the second aperture 132 are coaxial with each other and are each configured to receive the first cylindrical portion 118A of the shank 118 of the bolt 112 in snug and sliding engagement, as will be discussed further below.

As shown, the web 120 has a first length (LW), each of the first and second flanges 122, 124 has a second length (LF), and each of the first and second returns 126, 128 has a third length (LR). The third length is slightly less than half of the first length. As such, the first and second returns 126, 128 cooperate to define a gap 134 between the free ends thereof. In an embodiment, the third length could be about half of the first length so that the free ends of the first and second returns 126, 128 may abut each other. As shown, the second length is greater than the first length. In other embodiments, the second length could be the same as or less than the first length.

In further embodiments, the first flange 122 could be longer or shorter than the second flange 124. Also, the first return 126 could be longer or shorter than the second return 128.

With continued reference to FIG. 4, the web 120 has a first depth (top to bottom in FIG. 4), and the first and second flanges 122, 124 have a second depth larger than the first depth as shown. In some embodiments, the first and second returns 126, 128 have a third depth or a return depth that matches the first depth. The first and third depths extend to about a midpoint M of the hanger 114. The apertures 130, 132 are shown positioned beyond (i.e., below in FIG. 4) the first depth (i.e., below the midpoint M).

Figure 5A:
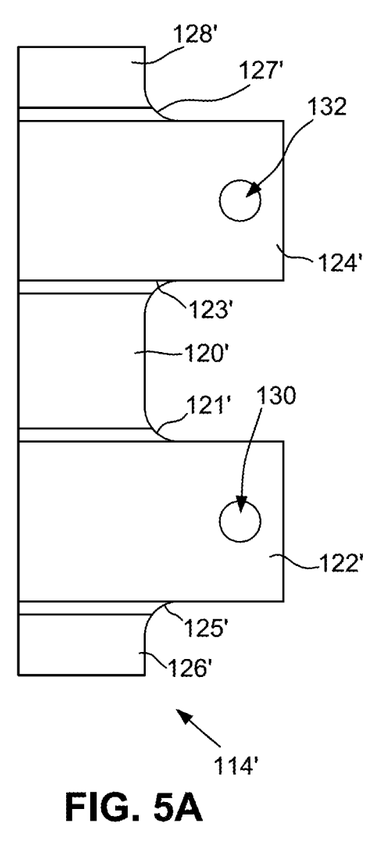
FIG. 5A is a top plan view of an illustrative blank from which the spring hanger of FIG. 4 may be formed.
Figure 5B:
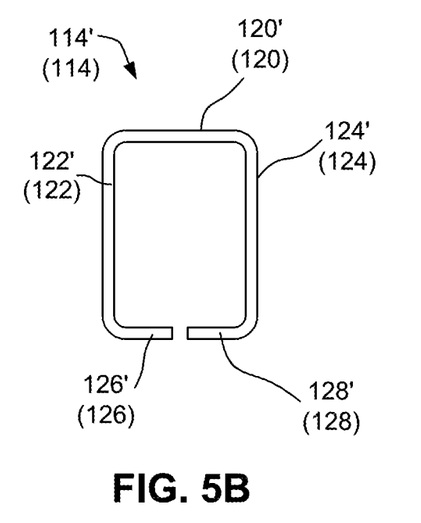
FIG. 5B is an end elevation view of the blank of FIG. 5A formed to yield the spring hanger of FIG. 4.

As best shown in FIGS. 5A and 5B, the hanger 114 may be formed from a blank 114' made of (i.e., cut or stamped from) metal sheet or plate. The blank 114' may be cut to form a first web portion 120', a first flange portion 122' immediately adjacent the web portion along a first bend line or region 121', a second flange portion 124' immediately adjacent the web portion along a second bend line or region 123' spaced from and parallel to the first bend line, a first return portion 126' immediately adjacent the first flange portion along a third bend line or region 125' spaced from and parallel to the first bend line, and a second return portion 128' immediately adjacent the second flange portion along a fourth bend line or region 127' spaced from and parallel to the second bend line. The first and second flange portions 122', 124' may be drilled, punched or otherwise formed to define the first and second apertures 130, 132, respectively.

With reference to FIGS. 5A and 5B, the first flange portion 122' may be bent with respect to the web portion 120' along the first bend line 121' so that the first flange portion and the web portion are generally perpendicular to each other. The second flange portion 124' may be bent with respect to the web portion 120' along the second bend line 123' so that the second flange portion and the web portion are generally perpendicular to each other and so that the first flange portion 122' and the second flange portion 124' are opposite and generally parallel to each other. The first return portion 126' may be bent with respect to the first flange portion 122' along the third bend line 125' so that the first return portion and the first flange portion are generally perpendicular to each other and so the that first return portion extends from the first flange portion toward the second flange portion 124' and the second return portion 128'. The second return portion 128' may be bent with respect to the second flange portion 124' along the fourth bend line 127' so that the second return portion and the second flange portion are generally perpendicular to each other and so that the second return portion extends from the second flange portion toward the first flange portion 122' and the first return portion 126'.

With the hanger 114 so formed, the first and second returns 126, 128 may be, but need not be, generally coplanar with each other, and the free ends thereof may be, but need not be, proximate or in abutment with each other.

The forgoing bend sequence to form the hanger 114 from the blank 114' is illustrative. In practice, any desired bend sequence may be adopted.

Respective first (or upper) ends of the web 120, the first flange 122, the second flange 124, the first return 126, and the second return 128 (that is, the end opposite the first and second apertures 130, 132) cooperate to define an edge 136 configured to abut a structural member to which the hanger 114 may be attached. For example, the edge 136 of the hanger 114 may be abutted against a chassis frame and any or all of the web 120, the first flange 122, the second flange 124, the first return 126, and the second return 128 of the hanger may be welded to the chassis frame at or proximate the edge 136. The weld may be continuous or stitched. The weld may be made around the outer perimeter of the hanger 114, the inner perimeter of the hanger, or both.

An end of a leaf spring or spring shackle having a mounting aperture may be received within the interior region 115 defined by the hanger 114, with the spring or shackle mounting aperture coaxial with the first and second apertures 130, 132, respectively, of the first and second flanges 122, 124. The bolt 112 may be inserted through the first aperture 130, through the mounting aperture of the spring or shackle, and through the second aperture 132, so that corresponding parts of the first portion 118A of the shank 118 are received within the first and second apertures 130, 132, so that the second portion 118B of the shank extends outwardly from the outer surface of the second flange 124, and so that the locking tab 116B engages with the free (or lower) end of the first flange 122. A nut (not shown) may be threaded onto the threaded portion of the second portion 118B of the shank 118, thereby retaining the bolt 112 and the spring or shackle to the hanger 114. A suitable locking device, for example, a lock washer, could be disposed between the nut and the second flange. In an embodiment, the bolt 112 could be inserted through the second aperture 132, the mounting aperture of the spring or shackle, and the first aperture 130 in an orientation opposite to that described above.

One skilled in the art would recognize that the locking tab 116B of the bolt 112 is configured to engage with the corresponding one of the first and second flanges 122, 124 to preclude rotation of the bolt when the nut is tightened thereto. This anti-rotation feature may allow an assembler to assemble a spring or shackle to the hanger 114 using fewer tools than when assembling a spring or shackle to a conventional spring hanger, and with less effort.

Figure 6A:
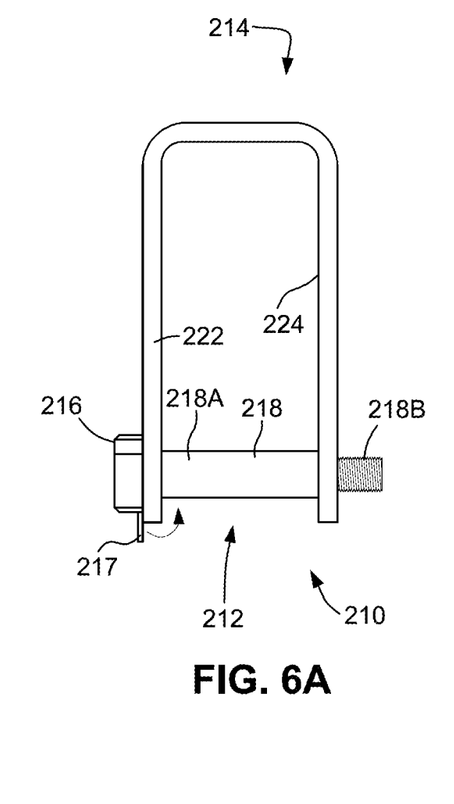
FIGS. 6A-6C are front, side, and perspective views of another illustrative spring hanger system according to the present disclosure.
Figure 6B:
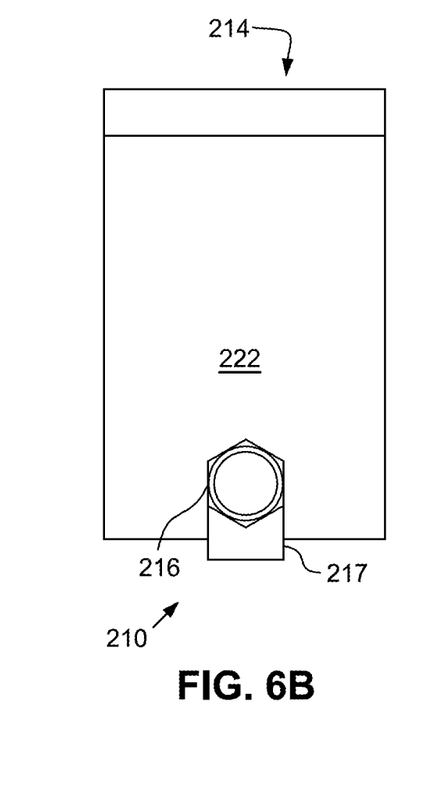
Figure 6C:
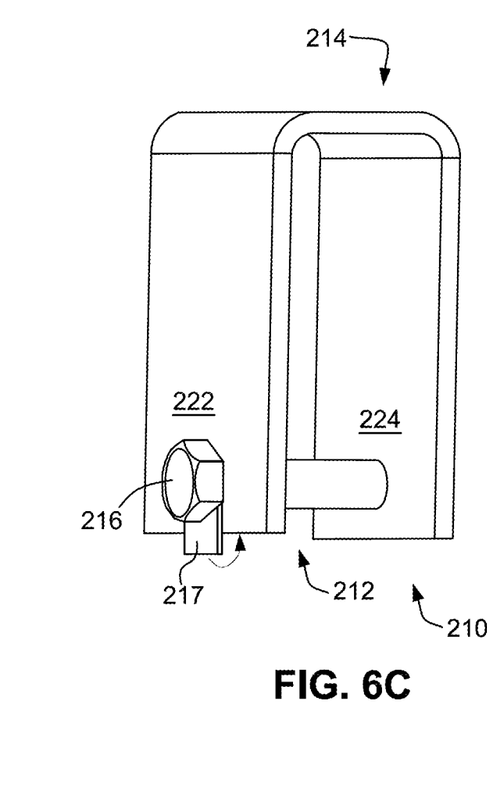

FIGS. 6A-6C show another illustrative system 210 including a bolt 212 and a hanger 214 according to the present disclosure. The system 210 is in many or most respects similar to the system 110 and will be discussed herein primarily in terms of its differences from system 110. Features of the system 210 having counterparts in the system 110 may be referred to herein using like terms and may be identified by like reference characters, incremented by 100.

The bolt 212 differs from the bolt 112 primarily in that the head 216 of the bolt 212 is a generally conventional hex head that further includes a bendable locking tab 217 extending from opposing flats of the hex head, proximate the interface between the head 216 and the shank 218. The bolt 212 otherwise is similar to the bolt 112. As shown, the system 210 includes a conventional U-shaped hanger 214 having first and second flanges 222, 224, although a hanger similar to the hanger 114 is contemplated for use in the system 210.

With the bolt 212 inserted through the first and second flanges 222, 224 (and the spring or spring shackle mounting aperture), the locking tab 217 may be bent against the free end of the corresponding one of the first flange and the second flange (as shown by the arrow in FIGS. 6A and 6C) to preclude rotation of the bolt with respect to the hanger 214.

Figure 7A:
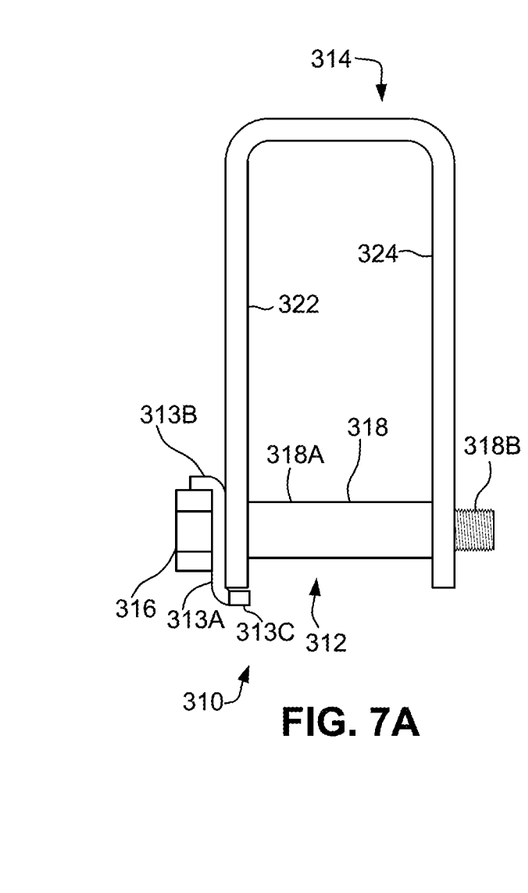
FIGS. 7A-7C are front, side, and perspective views of a further illustrative spring hanger system according to the present disclosure.
Figure 7B:
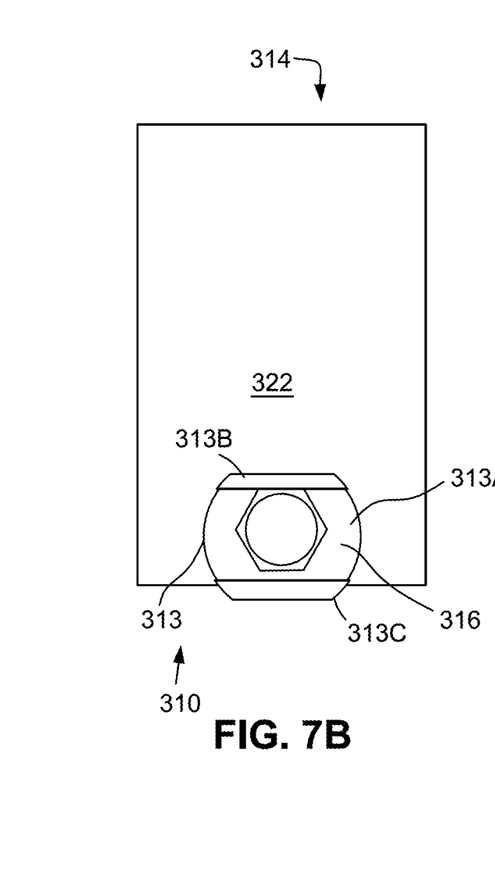
Figure 7C:
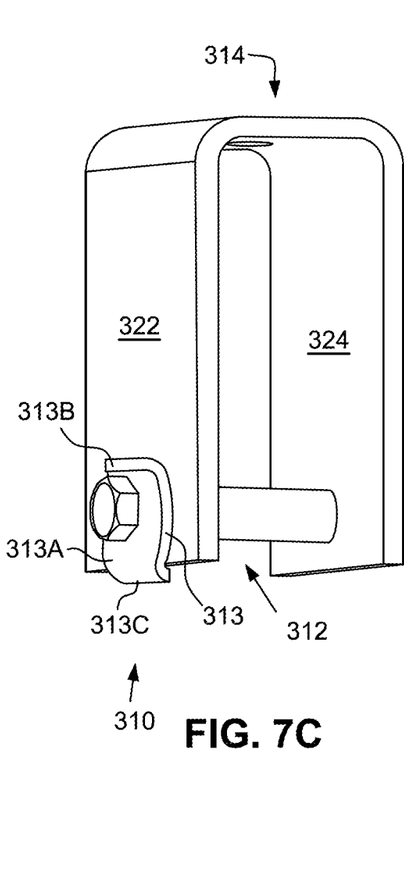

FIGS. 7A-7C show a further illustrative system 310 including a bolt 312 and a hanger 314 according to the present disclosure. The system 310 is in many or most respects similar to the system 110 and will be discussed herein primarily in terms of its differences from system 110.

Features of the system 310 having counterparts in the system 110 may be referred to herein using like terms and may be identified by like reference characters, incremented by 200.

The bolt 312 differs from the bolt 112 primarily in that the head 316 of the bolt 312 is a conventional hex head. The bolt 312 otherwise is similar to the bolt 112. As shown, the system 310 includes a conventional U-shaped hanger 314 having first and second flanges 322, 324, although a hanger similar to the hanger 114 is contemplated for use in the system 310.

Unlike the system 110, the system 310 also includes an S-shaped washer 313 having a base 313A, a first locking tab 313B extending in a first direction from the base, and a second locking tab 313C extending from the base in a second direction, the second direction opposite the first direction. The washer 313 is disposed between the head 316 of the bolt 312 and the outer surface of the first flange 322 so that the first locking tab 313B engages with one of the flats of the hex head of the bolt, and so that the second locking tab 313C engages with the free end of the first flange 322 when the bolt is inserted through the first and second flanges 322, 324. So assembled, the washer 313 cooperates with the first flange 322 to preclude rotation of the bolt 312 with respect to the hanger 314.

Figure 8A:
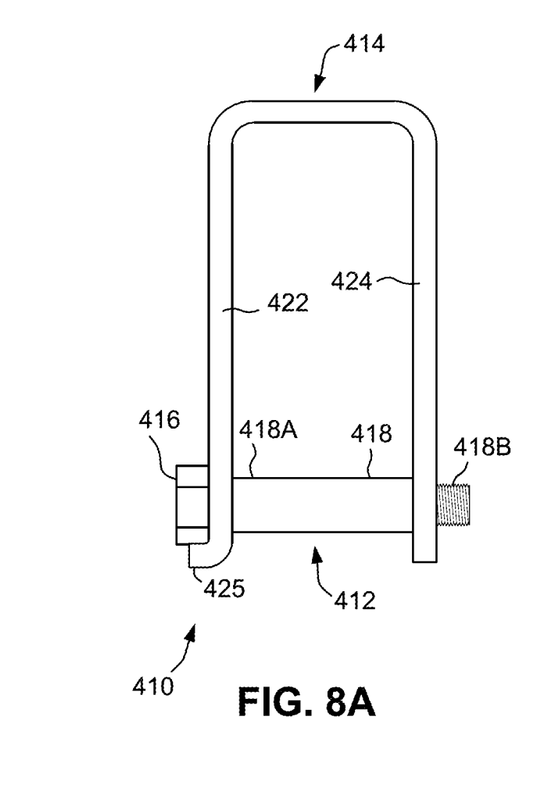
FIGS. 8A-8C are front, side, and perspective views of yet another illustrative spring hanger system according to the present disclosure.
Figure 8B:
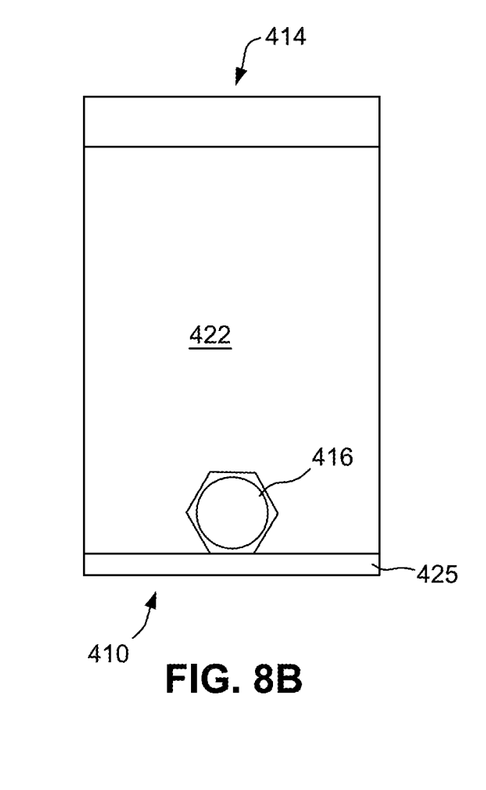
Figure 8C:
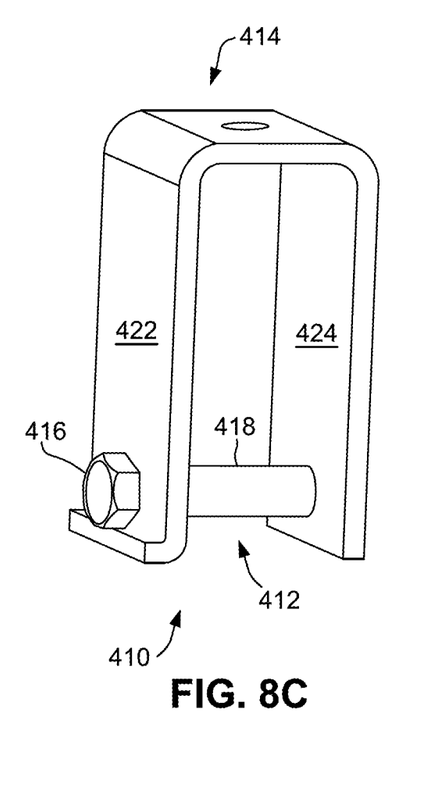

FIGS. 8A-8C show yet another illustrative system 410 including a bolt 412 and a hanger 414 according to the present disclosure. The system 410 is in many or most respects similar to the system 110 and will be discussed herein primarily in terms of its differences from system 110. Features of the system 410 having counterparts in the system 110 may be referred to herein using like terms and may be identified by like reference characters, incremented by 300.

The bolt 412 differs from the bolt 112 primarily in that the head 416 of the bolt 412 is a conventional hex head. The bolt 412 otherwise is similar to the bolt 112. As shown, the system 410 includes a conventional U-shaped hanger 414 having first and second flanges 422, 424, although a hanger similar to the hanger 114 is contemplated for use in the system 410.

Unlike the first flange 122 of the system 110, the free (lower) end of the first flange 422 is turned outwardly (away from the second flange 424) to define a locking tab 425 configured to engage with a flat of the head 416 of the bolt 412 when the bolt is inserted through the first and second apertures 430, 432 defined by the first and second flanges. So assembled, the locking tab 425 cooperates with the head 416 of the bolt 412 to preclude rotation of the bolt with respect to the hanger 414.

Figure 9A:
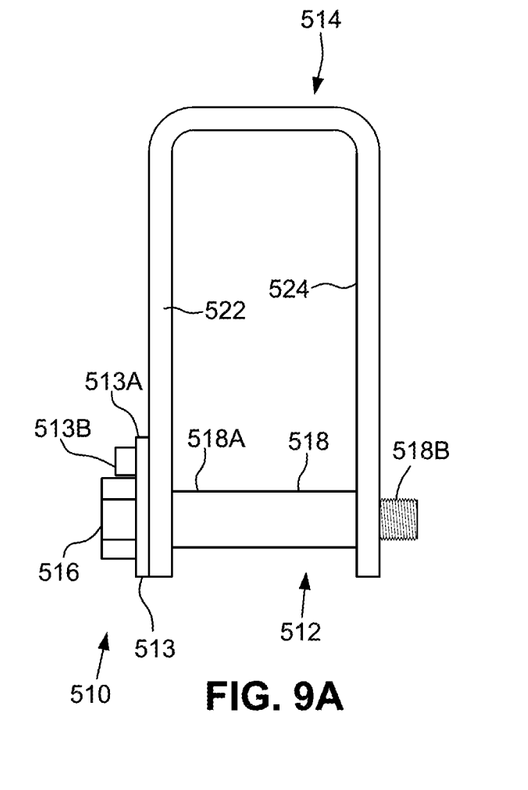
FIGS. 9A-9C are front, side, and perspective views of yet a further illustrative spring hanger system according to the present disclosure.
Figure 9B:
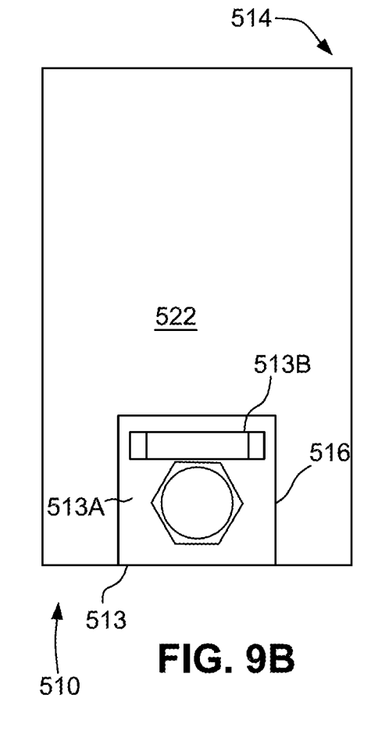
Figure 9C:
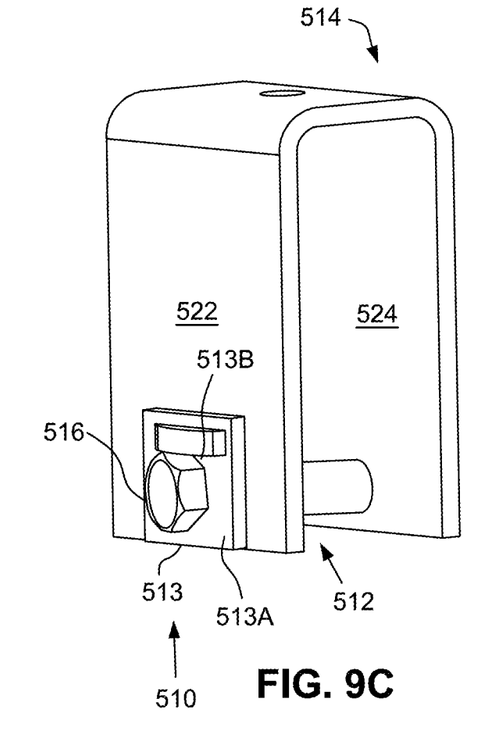

FIGS. 9A-9C show yet a further illustrative system 510 including a bolt 512 and a hanger 514 according to the present disclosure. The system 510 is in many or most respects similar to the system 110 and will be discussed herein primarily in terms of its differences from system 110. Features of the system 510 having counterparts in the system 110 may be referred to herein using like terms and may be identified by like reference characters, incremented by 400.

The bolt 512 differs from the bolt 112 primarily in that the head 516 of the bolt 512 is a conventional hex head. The bolt 512 otherwise is similar to the bolt 112. As shown, the system 510 includes a conventional U-shaped hanger 514 having first and second flanges 522, 524, although a hanger similar to the hanger 114 is contemplated for use in the system 510.

Unlike the system 110, the system 510 also includes a washer 513 having a generally planar base 513A and a lanced locking tab 513B extending outwardly from the base. The lanced locking tab 513B may be formed by lancing corresponding portions of the base 513A of the washer and pressing the portion of the base between the lanced portions out of the plane of the base. The washer 513 is disposed between the head 516 of the bolt 512 and the outer surface of the first flange 522 so that the lanced locking tab 513B engages with one of the flats of the head of the bolt when the bolt is inserted through the first and second flanges 522, 524. The washer 513 may include serrations in its surface facing the outer surface of the first flange 522 to mitigate a tendency of the washer to rotate with respect to the first flange. So assembled, the lanced locking tab 513B of the washer 513 cooperates with the head 516 of the bolt 512 to preclude rotation of the bolt with respect to the hanger 514.

Figure 10A:
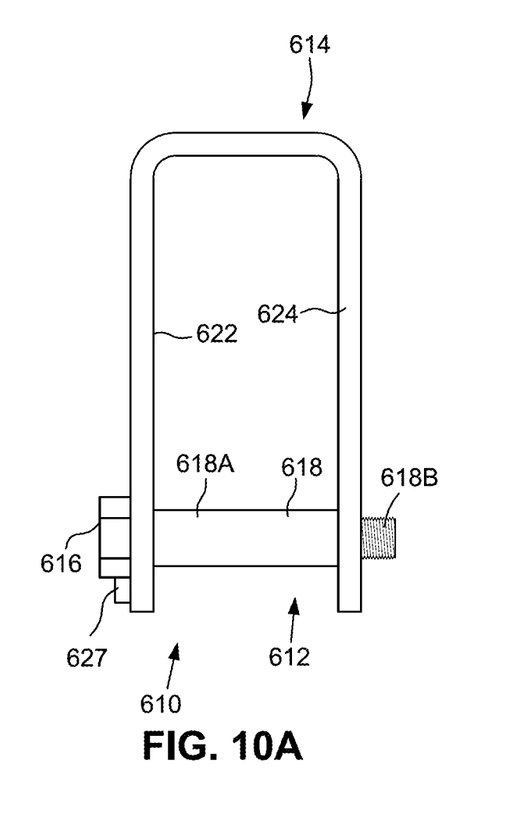
FIGS. 10A-10C are front, side, and perspective views of still another illustrative spring hanger system according to the present disclosure.
Figure 10B:
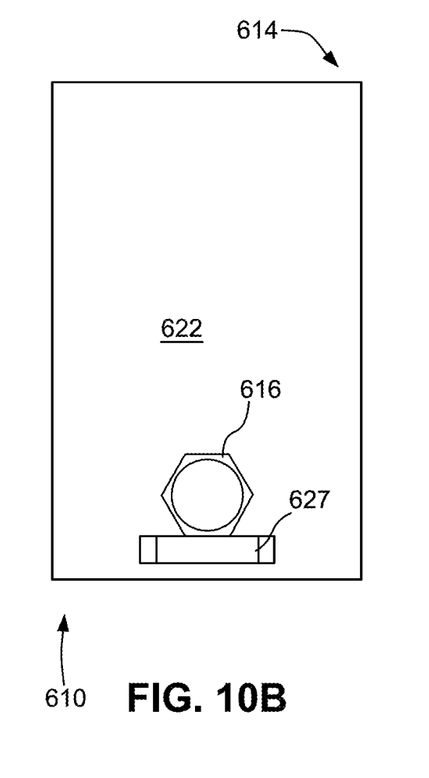
Figure 10C:
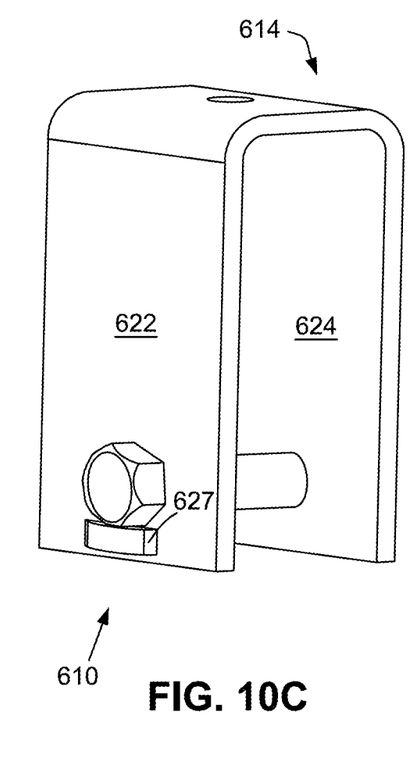
Figures 11A, 11B:
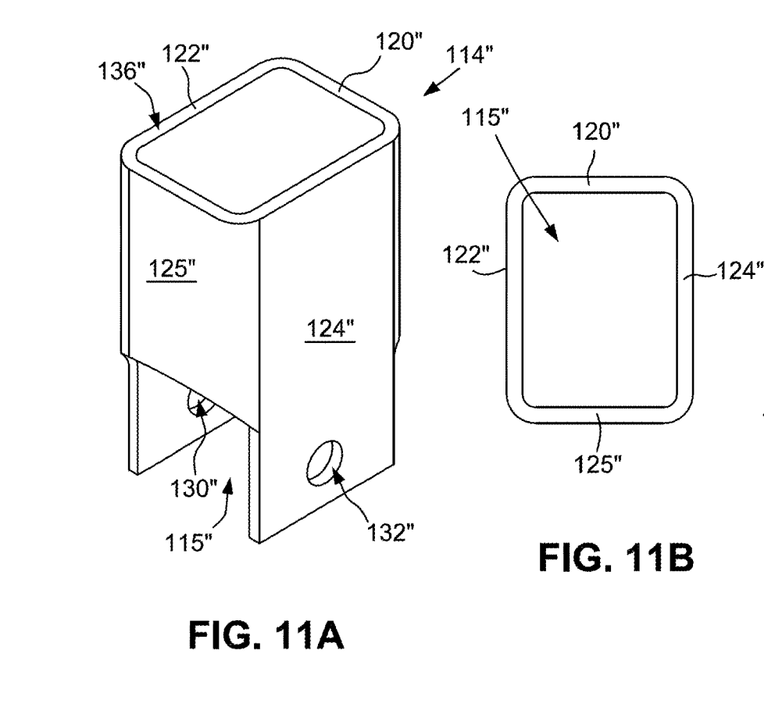
FIGS. 11A-11H are various views of alternative spring hangers according to the present disclosure.
Figure 11C:
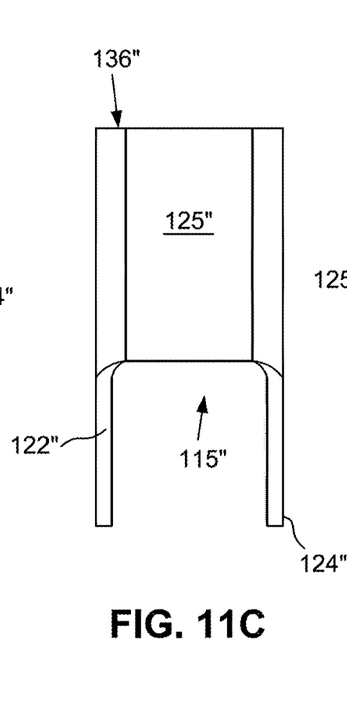
Figure 11D:
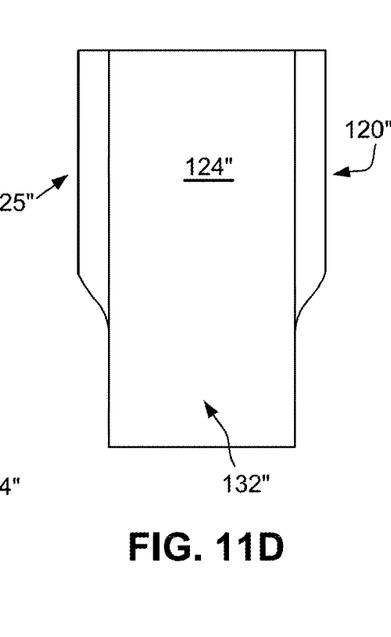
Figure 11E:
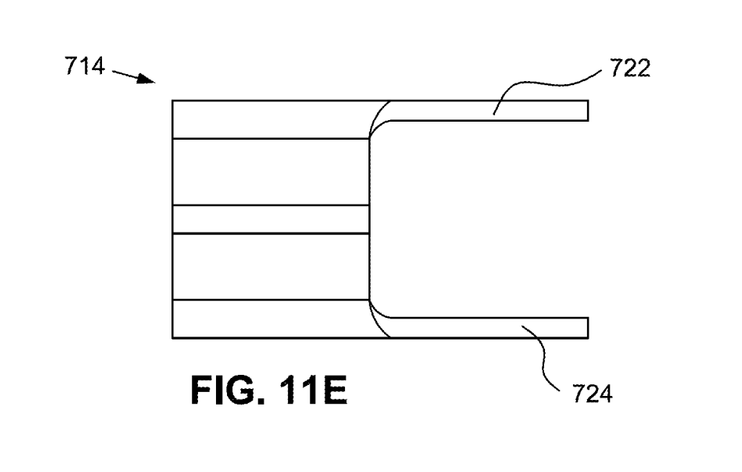
Figure 11F:
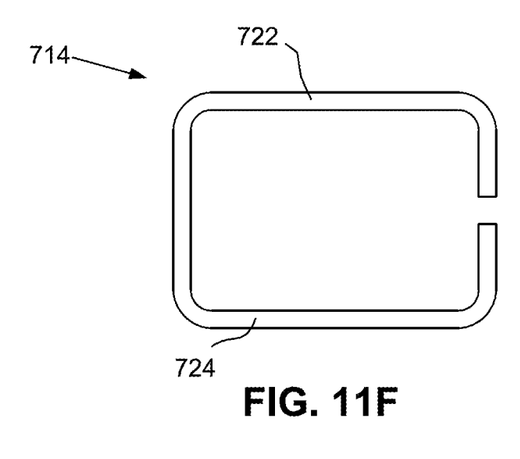
Figure 11G:
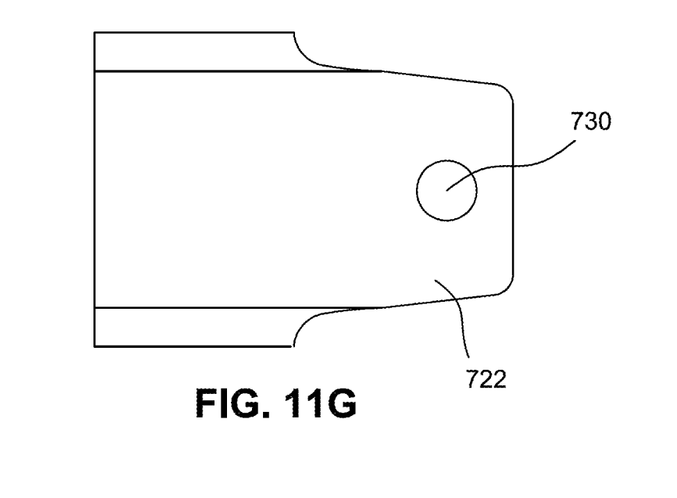
Figure 11H:
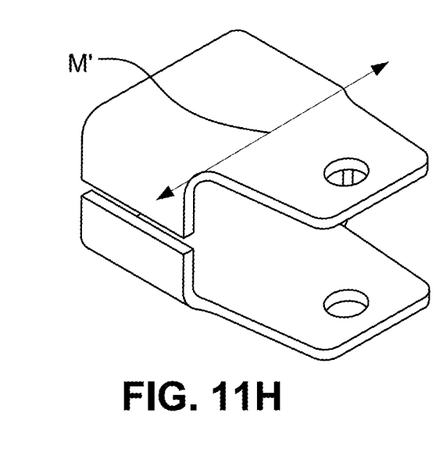
Figures 12A, 12B:
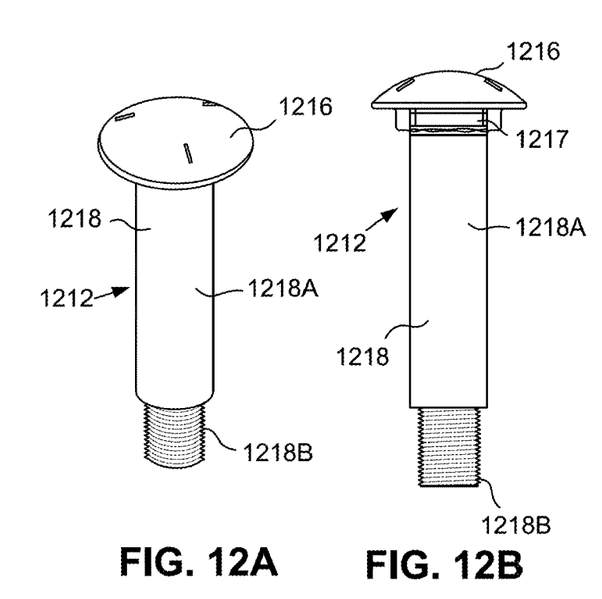
FIGS. 12A-12E are various views of an alternative spring hanger bolt according to the present disclosure.
Figure 12C:
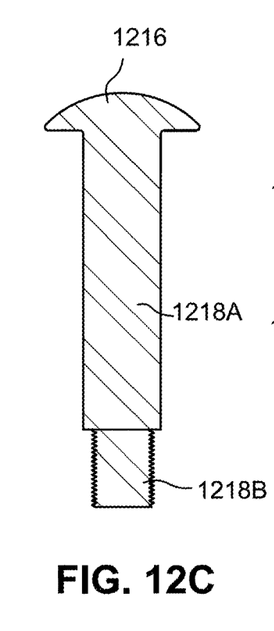
Figure 12D:
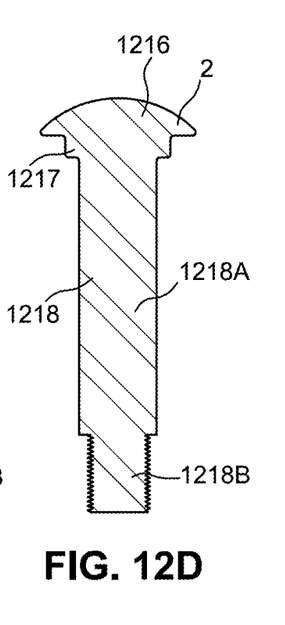
Figure 12E:
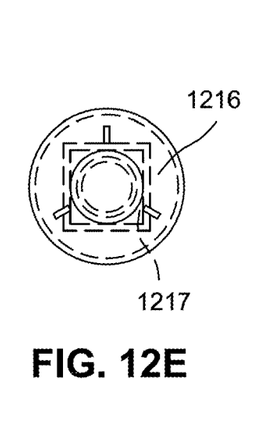

FIGS. 10A-10C show still another illustrative system 610 including a bolt 612 and a hanger 614 according to the present disclosure. The system 610 is in many or most respects similar to the system 110 and will be discussed herein primarily in terms of its differences from system 110. Features of the system 610 having counterparts in the system 110 may be referred to herein using like terms and may be identified by like reference characters, incremented by 500.

The bolt 612 differs from the bolt 112 primarily in that the head 616 of the bolt 612 is a conventional hex head. The bolt 612 otherwise is similar to the bolt 112. As shown, the system 610 includes a conventional U-shaped hanger 614 having first and second flanges 622, 624, although a hanger similar to the hanger 114 is contemplated for use in the system 610.

Unlike the first flange 122 of the system 110, the free (lower) end of the first flange 422 includes an integral lanced locking tab 627 extending outwardly from the first flange 622. (The lanced locking tab 627 is similar to the lanced locking tab 513B extending outwardly from the base 513 of the washer 513 of the system 510, and the lanced locking tab 627 may be formed in a similar manner as the lanced locking tab 513B.) The lanced locking tab 627 is configured to engage with a flat of the head 616 of the bolt 612 when the bolt is inserted through the first and second flanges 622, 624. So assembled, the lanced locking tab 627 cooperates with the head 616 of the bolt 612 to preclude rotation of the bolt with respect to the hanger 614.

FIGS. 11A-11D are various views of an alternative spring hanger 114" that could be used in lieu of the spring hanger of any of the foregoing embodiments. The spring hanger 114" is similar to the spring hanger 114 but is tubular and, therefore, lacks a gap analogous to the gap 134 of the spring hanger 114. As such, the spring hanger 114" includes a first side 120" analogous to the web 120 of the spring hanger 114, a second side 122" analogous to the first flange 122 of the spring hanger 114, a third side 124" analogous to the second flange 124 of the spring hanger 114, and a fourth side 125" or return web in place of the first and second returns 126, 128 and intervening gap 134 of the spring hanger 114. The second and third sides 122",124" may define respective apertures 130",132". The spring hanger 114" may be laser cut or otherwise cut or formed from a section of rectangular tube.

FIGS. 11E-11H are various views of another alternative spring hanger 714 that could be used in lieu of the spring hanger of any of the foregoing embodiments. The spring hanger 714 is similar to the spring hanger 114 but the first and second flanges 722, 724 include a bevel or taper beyond the midpoint M' of the hanger. That is, the first and second flanges 722, 724 taper from the midpoint M' toward distal ends of the first and second flanges.

FIGS. 12A-12E are various view of an alternative bolt 1212 for use with a modified spring hanger 1214. The alternative bolt 1212 includes a head 1216, a shank 1218, and a key portion 1217 intermediate the head and the shank. The head 1216 may have a circular and domed shape. The key portion 1217 may have a square cross-section configured to be received in and engage with sidewalls of a complementary square aperture, as will be discussed further below. The shank 1218 may be similar to the shank 118 of the bolt 112. The modified spring hanger 1214 may be identical to the spring hangers 114, 114" except that one or both of the first and second apertures 1230, 1232 of the modified spring hanger 1214 have a square cross-section whereas the first and second apertures 130, 132, 130",132" of the spring hangers 114, 114" have a round cross-section. In use, the alternative bolt 1212 may be inserted through the apertures 1230, 1232 of the modified spring hanger 1214 so that the key portion 1217 of the bolt is received within a corresponding one of the apertures. With the alternative bolt 1212 so received within the modified spring hanger 1214, the key portion 1217 cooperates with the corresponding aperture 1230, 1232 to inhibit rotation of the alternative bolt with the modified spring hanger 1214.

Material specifications, dimensions, and the like that may be shown in the drawings are illustrative and not limiting.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A bolt assembly for an axle hanger, the axle hanger including a first flange with a first aperture therein and a free edge and a second flange with a second aperture therein, the first and second apertures being coaxial, the bolt assembly comprising:
    a bolt head;
    a shank coupled with the bolt head, the shank including a first cylindrical portion having a first diameter and a second cylindrical portion having a second diameter less than the first diameter, wherein the second cylindrical portion extends coaxially from a distal end of the first cylindrical portion, and wherein the shank is extendable through the first and second apertures of the axle hanger; and
    a locking tab cooperable with one of the first flange and the second flange of the axle hanger, the locking tab being configured to preclude rotation of the bolt head.

2. A bolt assembly according to claim 1, wherein the second cylindrical portion of the shank is threaded.

3. A bolt assembly according to claim 1, wherein the locking tab is integral with the bolt head.

4. A bolt assembly according to claim 3, wherein the bolt head is rectangular, and wherein the locking tab is defined by a bent edge of the bolt head.

5. A bolt assembly according to claim 4, wherein the locking tab is perpendicular to the bolt head and is engageable with the free edge of the first flange.

6. A bolt assembly according to claim 1, wherein the bolt head comprises a hex-shape head, and wherein the locking tab comprises a bendable tab extending from opposing flats of the hex-shape head.

7. A bolt assembly according to claim 6, wherein the bendable tab is configured to be bent against the free edge of the first flange.

8. A bolt assembly according to claim 6, wherein the bendable tab is integral with the hex-shape head.

9. A bolt assembly according to claim 1, wherein the locking tab comprises a washer.

10. A bolt assembly according to claim 1, wherein the locking tab comprises a washer with a lanced locking tab extending outwardly therefrom.

11. A bolt assembly according to claim 1, wherein the first aperture is non-circular, and wherein the locking tab comprises a key intermediate the bolt head and the shank that is shaped corresponding to the first aperture.

12. A system comprising:
    a bolt having a cylindrical shaft and a head; and
    a hanger having a web, first and second generally parallel and spaced apart flanges extending from the web, the first flange defining a first aperture and the second flange defining a second aperture coaxial with the first aperture, the first and second apertures configured to receive the bolt therethrough,
    wherein one of the bolt and the hanger comprises a locking tab configured for locking engagement with the other of the bolt and the hanger, and wherein the locking tab cooperates with the other of the bolt and the hanger to preclude rotation of the bolt with respect to the hanger when the bolt is fully received within the first and second apertures with the head of the bolt abutting a corresponding surface of the first flange or the second flange.

13. A system according to claim 12, wherein the locking tab extends from the head of the bolt.

14. A system according to claim 13, wherein the locking tab is configured at manufacture for locking engagement with a free end of the first flange or the second flange to preclude rotation of the bolt with respect to the hanger.

15. A system according to claim 13, wherein the locking tab is configured at assembly for locking engagement with a free end of the first flange or the second flange to preclude rotation of the bolt with respect to the hanger.

16. A system according to claim 15, wherein the locking tab is bendable from a non-locking configuration to a locking configuration by a user at assembly of the bolt to the hanger for locking engagement with a free end of the first flange or the second flange to preclude rotation of the bolt with respect to the hanger.

17. A system according to claim 12, wherein the locking tab extends from a free end of one of the first flange and the second flange in a direction away from the other of first flange and the second flange.

18. A system according to claim 12, wherein the locking tab extends from one of the first flange and the second flange in a direction away from the other of first flange and the second flange.

\* \* \* \* \*